(12) United States Patent
Jetley et al.

(10) Patent No.: US 12,061,460 B2
(45) Date of Patent: Aug. 13, 2024

(54) SYSTEM AND METHOD FOR EFFORT ESTIMATION

(71) Applicant: ABB Schweiz AG, Baden (CH)

(72) Inventors: Raoul Jetley, Bangalore (IN); Will Baylor Snipes, Cary, NC (US); Srini Ramaswamy, Blacklick, OH (US)

(73) Assignee: ABB Schweiz AG, Baden (CH)

( * ) Notice: Subject to any disclaimer, the term of this patent is extended or adjusted under 35 U.S.C. 154(b) by 530 days.

(21) Appl. No.: 17/416,803

(22) PCT Filed: Oct. 23, 2019

(86) PCT No.: PCT/IB2019/059046
§ 371 (c)(1),
(2) Date: Jun. 21, 2021

(87) PCT Pub. No.: WO2020/128655
PCT Pub. Date: Jun. 25, 2020

(65) Prior Publication Data
US 2022/0066423 A1 Mar. 3, 2022

(30) Foreign Application Priority Data

Dec. 21, 2018 (IN) ............................. 201841048593

(51) Int. Cl.
*G05B 19/4155* (2006.01)
(52) U.S. Cl.
CPC ................. *G05B 19/4155* (2013.01); *G05B 2219/32291* (2013.01)
(58) Field of Classification Search
CPC ...... G05B 19/4155; G05B 2219/32291; G06Q 10/063; G06Q 10/06375; G06Q 50/04; Y02P 90/30
See application file for complete search history.

(56) References Cited

U.S. PATENT DOCUMENTS

| 8,782,201 B2 | 7/2014 | Kephart et al. |
| 9,898,607 B2 | 2/2018 | Chand et al. |
| (Continued) |

FOREIGN PATENT DOCUMENTS

WO WO-2014102700 A1 * 7/2014 ........... G05B 19/056

OTHER PUBLICATIONS

European Patent Office, International Search Report for PCT/IB2019/059046, mailed Dec. 18, 2019, 3 pages.
(Continued)

*Primary Examiner* — Yuhui R Pan
(74) *Attorney, Agent, or Firm* — Leydig, Voit & Mayer, Ltd.

(57) ABSTRACT

A method (600) for configuring one or more components of a process plant includes receiving (602) a change request (226) and receiving (604) a system dependency graph (228) corresponding to the process plant. The method (600) further includes selecting (606) a subset of components (230) among the plurality of components based on configuration of the process plant and identifying (608) a subset of nodes (232) among the plurality of nodes by traversing a path in the system dependent graph (228). The method (600) also includes computing (610) an impact parameter (234) value based on a traversed path and computing (612) a plurality of change parameter values (236) based on the traversed path. The method (600) further includes determining (614) an effort estimate (210) based on the impact parameter (234) value and the plurality of change parameter values (236) using a machine learning technique.

12 Claims, 6 Drawing Sheets

(56) References Cited

U.S. PATENT DOCUMENTS

| | | |
|---|---|---|
| 2005/0080646 A1 | 4/2005 | Garland |
| 2017/0099183 A1* | 4/2017 | Vaidyanathan .... G05B 19/0426 |
| 2019/0258401 A1* | 8/2019 | Li ......................... G06F 3/0604 |
| 2020/0218993 A1* | 7/2020 | Kumar ...................... G06F 8/36 |

OTHER PUBLICATIONS

European Patent Office, Written Opinion for PCT/IB2019/059046, mailed Dec. 18, 2019, 7 pages.

\* cited by examiner

SYSTEM AND METHOD FOR EFFORT ESTIMATION

CROSS-REFERENCE TO RELATED APPLICATIONS

This application is a U.S. national stage of International Application Serial No. PCT/IB2019/059046, filed Oct. 23, 2019, which claims priority to Indian Patent Application No. 201841048593, filed Dec. 21, 2018. The entire disclosures of both of the foregoing applications are incorporated herein by reference.

BACKGROUND

Embodiments of the present specification relate generally to implementing a change request in a process plant, and more particularly to estimating effort estimate for implementing a change request in an industrial automation system.

Maintenance and servicing of an industrial automation system such as a distributed control system (DCS) requires monitoring of system components such as, but not limited to, controllers and servers and identifying modifications required for optimized operation and preventive repairs. Typically, monitoring involves observing operational parameters of the industrial automation system and generating a 'change request' with reference to one or more components and subsystems. Implementing the change request involves change of one or more components of the industrial automation system and/or their functional aspects. These modifications typically reflected in reconfiguration of files for controllers, field devices and servers or altering documentation of rules for various processes specific to the plant Implementing the change request may also result in modifications to the system topology diagram, control logic diagram among other such systemic changes.

When a component change request is made, an automation engineer needs to plan the implementation of change request and communicate schedule of implementing the change request to the customer. The automation engineer is required to provide fairly accurate estimate of effort estimation to the customer before commencement of change implementation. Typically, the effort estimation (or equivalently the cost estimation) involves assessing all components of the automation engineering system that are impacted by the change, and hence need to be modified accordingly. At the same time, the engineer needs to ensure that the changes made do not inadvertently introduce new errors or unintended changes in the automation system.

Many effort estimation techniques have been in use with different estimation (such as Halstead's effort model) and regression models that typically require the feedback and expert inputs leading to possible human error and incorrect component recognition.

Recent advances in cloud based software service offerings and sophisticated machine learning techniques have enabled deployment of advanced analytics in various aspects of monitoring and preventing maintenance of components of the industrial automation systems. However, determining an optimum schedule for implementing change request has remained an off-line activity requiring human intervention and involvement of experts.

There is a need for superior techniques for implementing change requests in industrial automation systems.

BRIEF DESCRIPTION

In accordance with another aspect of the present specification, a system for configuring one or more components among a plurality of components of a process plant is disclosed. The system is configured to optimize an industrial process deployed in the process plant. The system includes a data acquisition unit communicatively coupled to a client station and configured to receive a change request. The change request includes a specification of modification required in a component among the plurality of components of the process plant. The system further includes a database unit communicatively coupled to the data acquisition unit and configured to store historical data generated by the process plant and a plurality of configuration files corresponding to the plurality of components. The system also includes a graph builder unit communicatively coupled to the database unit and configured to build a system dependency graph corresponding to the process plant based on a plurality of configuration files corresponding to the plurality of components. The system dependency graph includes a plurality of nodes representative of the plurality of components of the process plant. The plurality of links is coupled with one another via a plurality of links representative of dependency weights. The system includes a machine learning unit communicatively coupled to the graph builder unit and configured to select a subset of components based on configuration of the process plant among the plurality of components, wherein the subset of components are related to the component specified by the change request. The machine learning unit is further configured to identify a subset of nodes among the plurality of nodes by traversing the system dependent graph. The plurality of nodes corresponds to the subset of components and the component specified by the change request. The subset of nodes corresponds to a plurality of categories of components. The machine learning unit is also configured to compute an impact parameter value based on a traversed path in the system dependent graph. The impact parameter is representative of degree of complexity of changes in the system due to the component. The machine learning unit is further configured to compute a plurality of change parameter values based on the traversed path. The plurality of change parameters are representative of degree of complexity of changes in the system due to the plurality of categories of components. The machine learning unit is also configured to determine an effort estimate based on the impact parameter value and the plurality of change parameter values using a machine learning technique. The effort estimate includes a schedule for implementing the change request and a cost of implementing the change request. The method also includes implementing the change request based on the effort estimate. Implementing the change request includes configuring the one or more components of the process plant.

In accordance with one aspect of the invention, a method for configuring one or more components of a process plant to optimize an industrial process deployed in the process plant is disclosed. The method includes receiving a change request by data acquisition system via a client station. The change request includes a specification of modification required in a component among the plurality of components of the process plant. The method further includes receiving, from a database, a system dependency graph corresponding to the process plant. The system dependency graph includes a plurality of nodes representative of the plurality of components of the process plant. The plurality of links is coupled with one another via a plurality of links representative of dependency weights. The method also includes selecting a subset of components among the plurality of components based on configuration of the process plant. The plurality of components is related to the component specified by the change request. The method further includes identifying a subset of nodes among the plurality of nodes by traversing the system dependent graph. The plurality of nodes corresponds to the subset of components and the component specified by the change request. The subset of nodes corresponds to a plurality of categories of components. The method also includes computing an impact parameter value based on a traversed path in the system dependent graph. The impact parameter is representative of degree of complexity of changes in the system due to the component. The method includes computing a plurality of change parameter values based on the traversed path. The plurality of change parameters are representative of degree of complexity of changes in the system due to the plurality of categories of components. The method further includes determining an effort estimate based on the impact parameter value and the plurality of change parameter values using a machine learning technique. The effort estimate includes a schedule for implementing the change request and a cost of implementing the change request. The method also includes implementing the change request based on the effort estimate. Implementing the change request includes configuring the one or more components of the process plant.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, techniques for monitoring of an industrial system are presented. More particularly, a condition monitoring device and a corresponding method of condition monitoring of electric equipment in an industrial system are presented.

The term 'industrial system' may refer to a power plant or a manufacturing unit commissioned typically in a single geographic location. The term 'process plant' is used to refer to an industrial facility adopting a pre-designed process and constituting whole or part of the industrial system. The term 'equipment' is used to refer to one or more devices, machines or subsystems of an industrial system. The term 'component' is used to refer to part of the equipment or a part of the process plant. The phrase 'change request' refers to a requirement for changing or modifying a component or a function of the component. The change request is required to optimize an industrial process and/or an industrial automation system deployed in the process plant. The phrase 'effort estimate' is used to refer to an estimate of efforts and/or resources required to implement the change request. The effort estimate is based on assessment of components that are affected by the change request, time required to implement the change request and the cost of implementing the change request.

Figure 1:
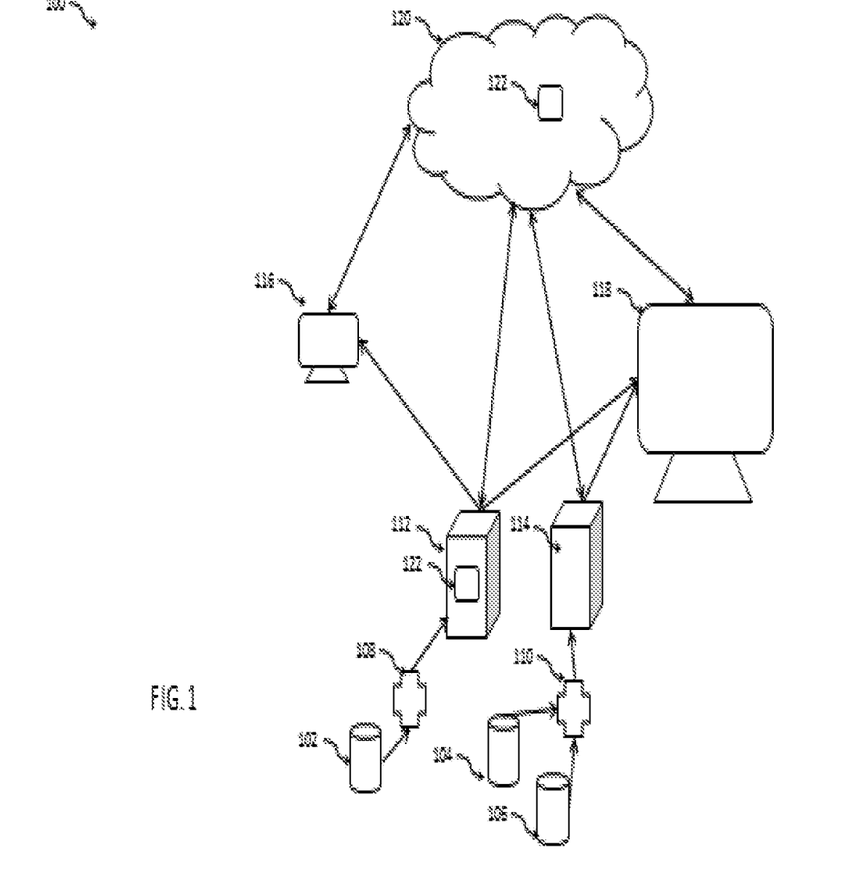
FIG. 1 illustrates an industrial automation infrastructure having an effort estimator in accordance with an exemplary embodiment.

FIG. 1 illustrates an industrial automation infrastructure 100 having a system for effort estimation in accordance with an exemplary embodiment. The industrial automation infrastructure 100 includes a plurality of field devices 102, 104, 106 configured to sense signals from industrial assets and performs engineering measurements. The field devices 102, 104, 106 may include sensors, communication equipment and computers. The field devices 102, 104, 106 are communicatively coupled with other one or more field devices and/or with servers 112, 114 via a plurality of routers 108, 110. The servers 112, 114 are provided with a client terminal 116 or an engineering work station 118 for accessing the field devices 102, 104, 106, controlling routers 108, 110 and communicating with servers 112, 114. The client terminal 116 and the engineering workstation 118 are also configured to communicate with a cloud server 120 configured to provide state of the art data analytics, supervisory and control functionalities. The industrial automation infrastructure 100 is configured to monitor operation of an industrial plant, assess operating performance, diagnose problems and enable modifications in the industrial plant and/or industrial automation system. A system upgrade, a fault or a need for component change requires modifications in the industrial automation infrastructure 100. The industrial automation infrastructure is further configured to receive and/or generate change requests and perform implementation of the change request. In some embodiments, the industrial automation infrastructure 100 may also assist field engineers or other engineering resources to effectively implement the change requests. Implementation of change requests necessitates accurate estimation of effort involved in implementing the change request and determines a schedule for such implementation. In embodiments of the present specification, a system for estimating effort involved in implementing a change request is disclosed. In one example, a server 112 includes the system 122 for estimating the effort. In another embodiment, the cloud server 120 includes the system 122 for effort estimation. The system 122 for estimating effort is configured to receive a change request and provide an accurate estimate of effort involved in implementing the change request using system configuration information and historical change request data.

Figure 2:
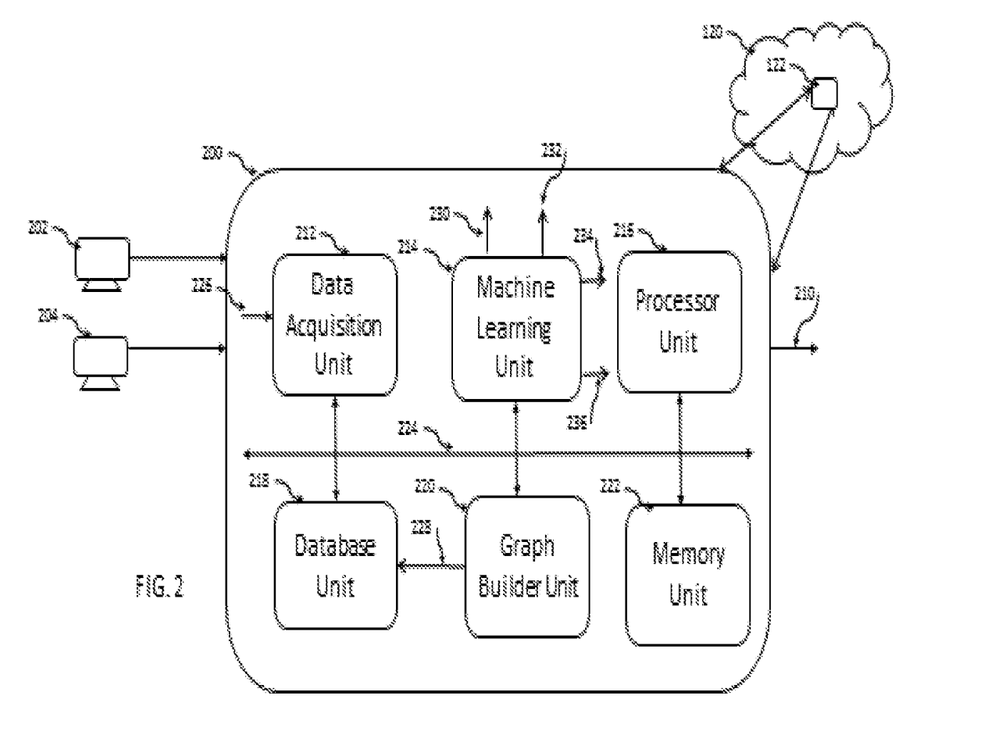
FIG. 2 is a system for estimating effort for implementing a change request in the industrial automation system of FIG. 1 in accordance with an exemplary embodiment.

FIG. 2 is a system 200 for estimating effort for a change request in the industrial automation system of FIG. 1 in accordance with an exemplary embodiment. The system 200 is a detailed version of block 122 implemented in cloud 120 as illustrated in FIG. 1. The system 200 includes a data acquisition unit 212, a machine learning unit 214, a processor unit 216, a database unit 218, a graph builder unit 220 and a memory unit 222 communicatively coupled with each other via a communications bus 224. The system 200 is communicatively coupled with client and engineering workstations 202, 204 and configured to receive a change request 226 provided either from an operator or from an automation server. The system 200 is also configured to leverage historical data related to operation of the plant, previously generated change requests and corresponding effort details required for implementing the change requests. The system 200 is further configured to generate an estimate of effort 210 required to implement the change request and a schedule of activities for implementing the change request.

The data acquisition unit 212 is communicatively coupled to at least one of the client station 202 and the engineering workstation 204 and configured to receive the change request 226. The change request 226 includes a specification of modification required in a component among the plurality of components of the process plant. The data acquisition unit 212 includes communication circuitry to receive data from workstations 202, 204. The data acquisition unit 212 also includes signal conditioning mechanism to perform signal conditioning operations and data processing functions. In one embodiment, the data acquisition unit 212 is configured to access the database unit 218 to retrieve historical data. Further, the data acquisition unit 212 is also configured to access labeled datasets required for training the machine learning model and trained machine leaning models required for effort estimation.

The database unit 218 is communicatively coupled to the data acquisition unit 212 and configured to store historical data generated by the process plant and a plurality of configuration files corresponding to the plurality of components. The database unit 218 may include memory storage and may support one or more database schemes. Non-limiting examples of database schemes supported by the database unit 218 include a structured query language (SQL) database, a relational data base management system (RDBMS), a no-SQL database such as a Mango database. The database unit 218 is also configured to store machine learning models, and structural information of the industrial plant and/or industrial automation infrastructure required by the graph building unit 220.

The graph builder unit 220 is communicatively coupled to the database unit 218 and configured to build a system dependency graph (SDG) 228 corresponding to the process plant based on a plurality of configuration files used to operate the plurality of components. The system dependency graph 228 is an abstract representation of the industrial plant and/or industrial automation system and includes a plurality of nodes representative of the plurality of components of the process plant coupled with one another via a plurality of links representative of dependency weights. The components represented by nodes of the system dependency graph 228 includes at least one of a tag, a human machine interface component, a topology element, a control logic diagram, a function, a program organization unit (POU), a controller, and an application.

The machine learning unit 214 is communicatively coupled to the graph builder unit 220 and configured to select a subset of components 230 among the plurality of components related to the component specified by the change request based on configuration of the process plant. The machine learning unit 214 is further configured to identify a subset of nodes 232 among the plurality of nodes corresponding to the subset of components 230 and the component specified by the change request by traversing the system dependent graph 228. The subset of nodes 232 corresponds to a plurality of categories of components. The machine learning unit is also configured to compute an impact parameter 234 value based on a traversed path in the system dependent graph 228. The impact parameter 234 is representative of size of changes and degree of complexity of changes in the system due to the component. In one embodiment, the size of change is represented by number of nodes in the traversed path. In another embodiment, the size of change is represented by sum of link weights along the traversed path. Further, the complexity of change is represented by number of function codes associated with the traversed path. In one embodiment, the machine learning unit 214 is further configured to modify the impact parameter 234 value using a power law model to account for the complexity of changes. Specifically, a correction factor computed based on the power law uses number of function codes corresponding to the number of affected function codes. In one example, a change parameter corresponding to the function codes in the system dependency graph may be used to determine the correction factor. In one embodiment, the correction to the impact parameter 234 using power law is given by $xa^p$, where x is representative of unmodified impact parameter, a is a median number of input-output ports per function code, and p is percentage of function codes affected by the change request.

The machine learning unit 214 is further configured to compute a plurality of change parameter values 236 based on the traversed path. The plurality of change parameter values 236 are representative of degree of complexity of changes in the system due to the plurality of categories of components. In some embodiments, the plurality of change parameter values 236 may also be modified by the power law used to modify the impact parameter 234. The machine learning unit 214 is also configured to determine an effort estimate based on the impact parameter 234 value and the plurality of change parameter values 236 using a machine learning technique. The effort estimate includes a schedule for implementing the change request and a cost of implementing the change request. The machine learning unit 214 is also configured to implement the change request based on the effort estimate. Implementing the change request includes configuring the one or more components of the process plant. Activities involved in implementing the change request also include, but not limited to, automatically reconfiguring one or more components of the industrial plant and/or industrial automation infrastructure, modifying the configuration files used by the industrial plant and/or industrial automation infrastructure after completing the change request implementation.

In one embodiment, the machine learning unit 214 is further configured to determine a machine learning model based on a plurality of labeled datasets related to change requests and corresponding effort values. Specifically, a machine learning model is trained using the labeled datasets for required accuracy. The trained machine learning model is validated for a subset of labeled dataset and stored in the database unit 218 to be used in deployment phase.

The processor unit 216 is communicatively coupled to the communications bus 224 and configured to perform various computational tasks required for estimating effort for implementing the change request. The processor unit 216 is further configured to access the memory unit 222 and the database unit 218. In one embodiment, the processor unit 216 includes one or more microprocessors or controllers configured to support the functionalities of one or more of the data acquisition unit 212, the machine learning unit 214, and the graph builder unit 220. The processor unit 216 may also be a digital signal processor (DSP), a field programmable gate array (FPGA), or an application specific integrated circuit (ASIC) specifically designed to support one of the functional units 212, 214, 220.

The memory unit 222 is communicatively coupled to the processor unit 216 and configured to store software code and data required by various units 212, 214, 220. In one embodiment, the memory unit 222 may also perform the functionality of the database unit 218. It may be noted herein that the memory unit 222 may include a plurality storage modules such as a random access memory (RAM), and read only memory (ROM). The memory unit 222 may also include programmable ROM (PROM), erasable PROM (EPROM) and flash memory units.

Figure 3:
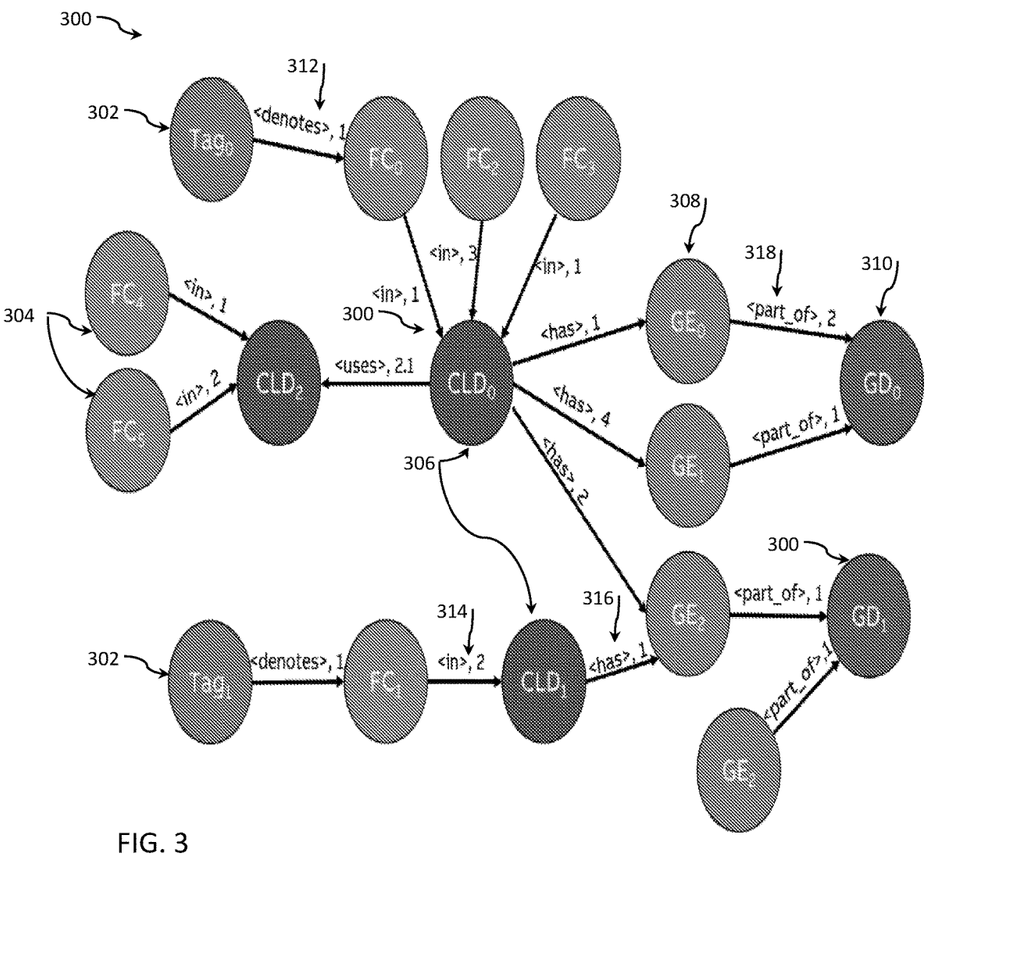
FIG. 3 is a system dependence graph (SDG) used by the effort estimator of FIG. 2 in accordance with an exemplary embodiment.

FIG. 3 is a system dependence graph (SDG) 300 used by the system of FIG. 2 in accordance with an exemplary embodiment. The SDG 300 is detailed version of the SDG 228 of FIG. 2. The SDG 300 is generated by the graph builder unit 220 and is detailed version of SDG represented by reference numeral 228 in FIG. 2. In the illustrated embodiment, the SDG 300 includes a plurality of nodes 302, 304, 306, 308 representative of a plurality of types of elements of the industrial automation infrastructure 100. The node 302 is representative of a tag element, the node 304 is representative of a function code, the node 306 is representative of a control logic diagram, the node 308 is representative of a graphic element, and the node 310 is representative of a graphic diagram. The SDG 300 further includes a plurality of links 312, 314, 316, 318 connected the plurality of nodes. It may be noted that only some of the plurality of nodes and some of the plurality of links of the SDG 300 are represented by reference numerals for convenience of illustration. The SDG 300 is representative of industrial automation infrastructure architecture and/or plant architecture where a change request is to be implemented. The SDG 300 is built based on the knowledge of industrial plant and/or corresponding industrial automation infrastructure and associated functionality. Each of the plurality of links 312, 314, 316, 318 connects two nodes, the first node is termed herein as 'source node' and the second node is referred herein as 'destination node'. Each of these links is associated with numerical values referred herein as 'weights.' Each node in the SDG 300 is representative of a component or a subsystem of the industrial plant. The links of the SDG 300 are representative of relationships and dependencies between the corresponding source and destination nodes. The weight associated with a link is representative of a dependency of the destination node associated with the link on the corresponding source node. The plurality of weights of the SDG 300 is determined apriori based on the historical data related to previously generated request changes.

Figure 4:
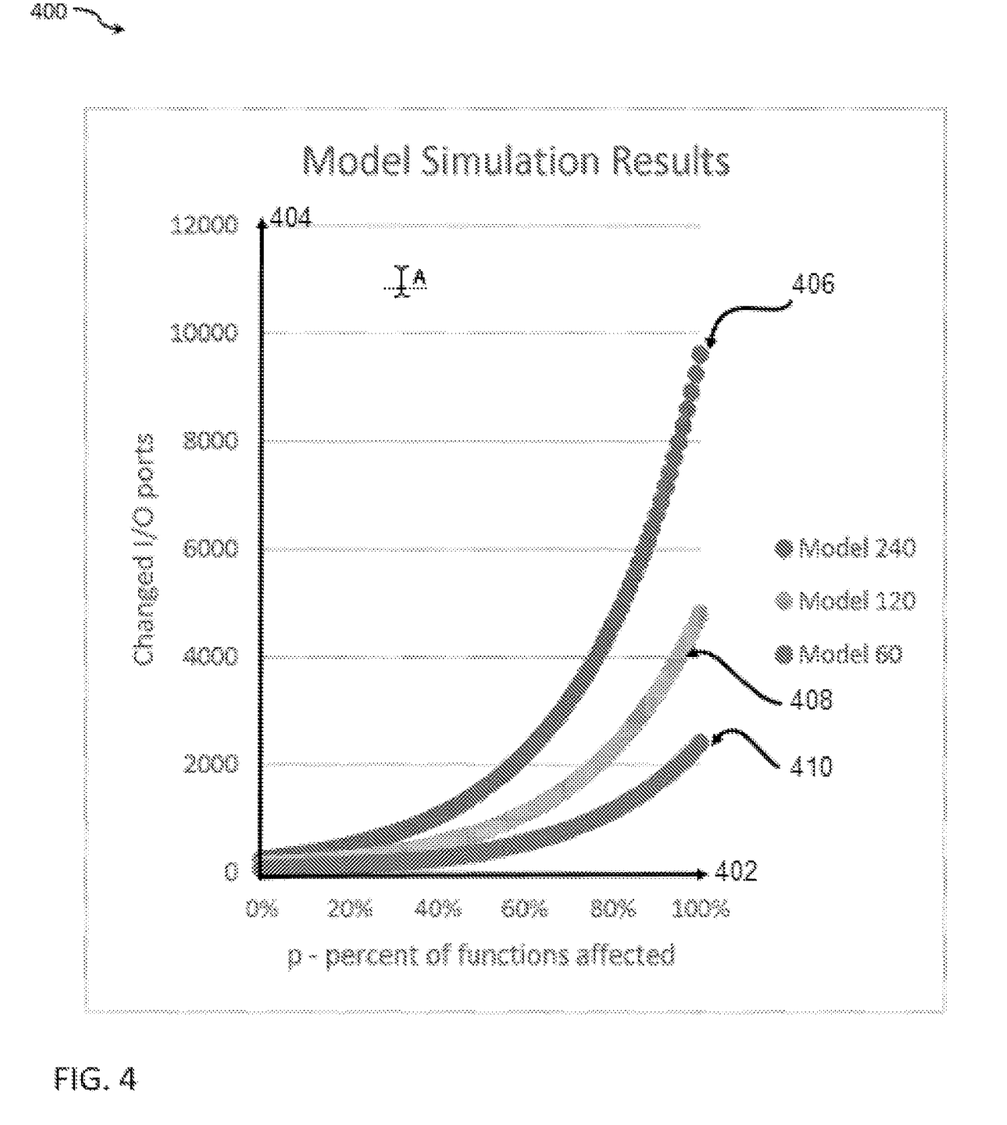
FIG. 4 is a schematic illustrating computation of impact parameter in accordance with an exemplary embodiment.

FIG. 4 is a graph 400 illustrating effect of complexity on effort involved in change implementation in accordance with an exemplary embodiment. The graph 400 includes an x-axis 402 representation of percent of function codes. The graph 400 also includes a y-axis 404 representative of changed input-output ports associated with the corresponding function codes. The graph 400 includes a first curve 406 corresponding to a case having two hundred and forty function codes. The graph 400 includes a second curve 408 corresponding to a case having one hundred and twenty function codes and a third curve 410 corresponding to a third case having sixty function codes. A mean of forty function codes is considered in generating all the three curves 406, 408, 410. The curves exhibit non-linear effect of complexity factor on the impact parameter 234 used for estimation of effort for implementing a change request.

Figure 5:
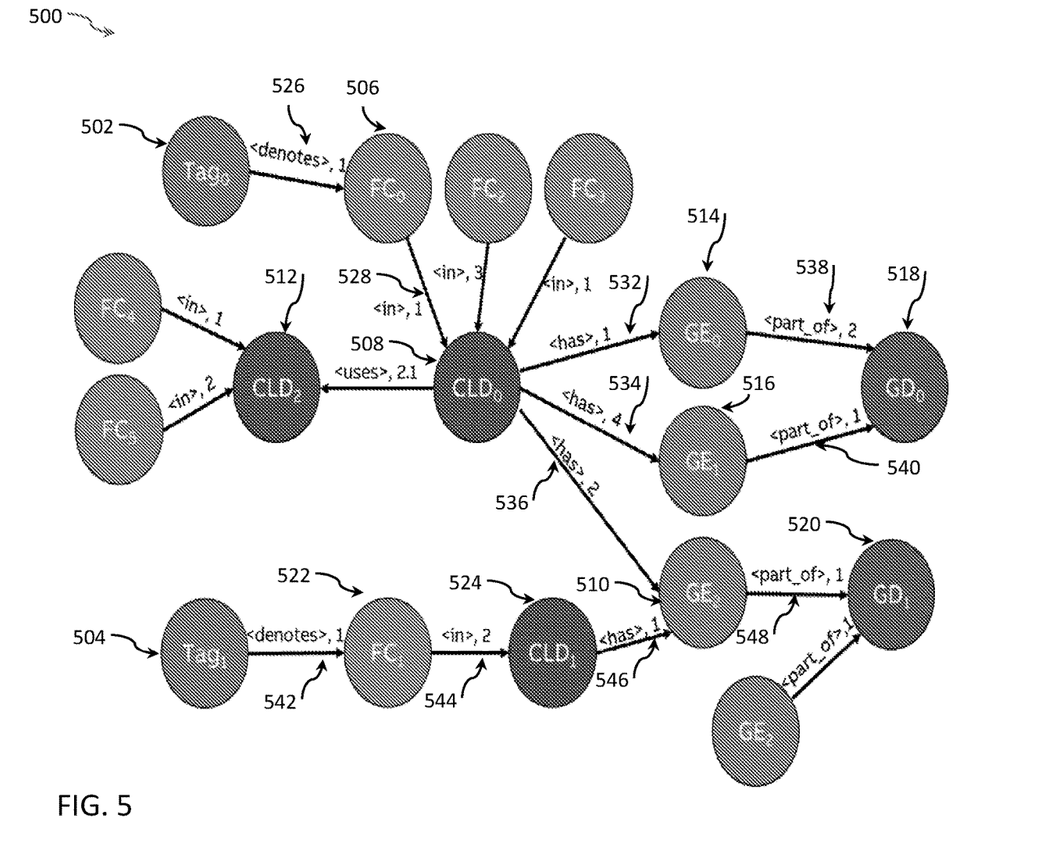
FIG. 5 is a graph 500 illustrating effect of complexity on effort involved in change implementation in accordance with an exemplary embodiment.

FIG. 5 is a graph 500 illustrating computation of impact parameter 234 in accordance with an exemplary embodiment. The graph 500 corresponds to the SDG of FIG. 3 illustrating an example computation of impact parameter in accordance with embodiments of the present specification. The example corresponds to an example change request specifying an example component requiring a change. The example component is mapped in the SDG 500 as nodes 502 and 504. The node 502 is a tag component and is used as a starting point for graph traversing. The graph traversing is performed based on the knowledge of structure of plant and/or industrial automation infrastructure and functionality of the components involved. Other components related to the example components are identified and corresponding nodes in the SDG 500 are traversed. In the illustrated example, the graph 500 is traversed along a path covering the nodes 506, 508, 510, 512 sequentially. From the node 508, parallel paths are traversed in the SDG 500 covering nodes 514, 516 and 518. The SDG 500 is further traversed from nodes 516 and 518 to cover nodes 520 and 522 respectively. Similarly, SDG 500 is also traversed from the node 502 covering nodes 524, 526 and 510. The links in the traversed paths 528, 530, 532, 534, 536, 538, 540, 542, 544, 546, 548 are considered for determination of impact parameter. Weights of the considered links are added to get an impact parameter of 19.1.

Figure 6:
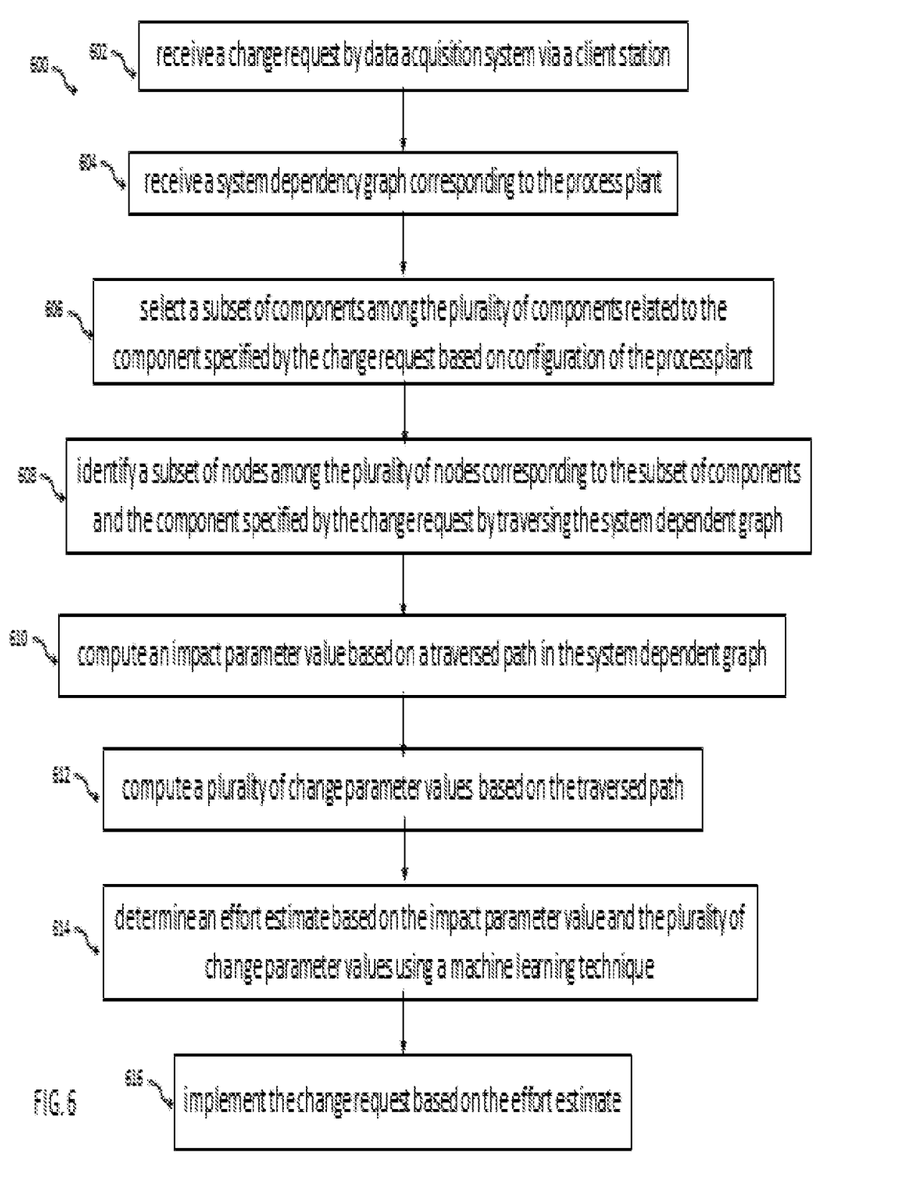
FIG. 6 is a flow chart of a method for effort estimation corresponding to a change request in an industrial automation system of FIG. 1.

FIG. 6 is a flow chart 600 of a method for effort estimation corresponding to a change request in an industrial automation system of FIG. 1. The method includes receiving a change request by data acquisition system via a client station as illustrated in step 602. The change request includes a specification of modification required in a component among the plurality of components of the process plant. In some cases, the change request may also specify more than one component requiring modification.

At step 604, the method further includes receiving, from a database, a system dependency graph (reference numeral 228 of FIG. 2) corresponding to the process plant. The system dependency graph 228 includes a plurality of nodes representative of the plurality of components of the process plant coupled with one another via a plurality of links representative of dependency weights. The components represented by nodes of the system dependency graph 228 include at least one of a tag, a function code, a graphical element, a control logic diagram and a graphic element. The nodes may also represent a human machine interface component, a topology element, a control logic diagram, a function, a program organization unit (POU), a controller, and an application. Each of the nodes of the system dependency graph 228 is represented by a triple including a unique identifier, a type of component and a display name.

Each of the plurality of links is represented by a quintuple including a unique identifier, a source node, a destination node, a relation between the system components with reference to a link under consideration and a weight value between the source node and the destination node. The system dependency graph 228 is constructed based on dependency data collected using a plurality of application program interfaces (APIs).

The method also includes selecting a subset of components 230 among the plurality of components related to the component specified by the change request based on configuration of the process plant as illustrated in 606. The subset of components 230 may be mapped on the SDG as distinct initial set of nodes which are used as initial nodes for graph traversing.

At step 608, the method further includes identifying a subset of nodes 232 among the plurality of nodes corresponding to the subset of components 230 and the component specified by the change request by traversing the system dependent graph 228. The subset of nodes 232 corresponds to a plurality of categories of components. The traversing is performed by identifying all the connected nodes to the initial nodes based on automation system information related to the change request. A traversed path having a subset of links corresponding to the subset of nodes 232 is identified.

The method also includes computing an impact parameter 234 value based on a traversed path in the system dependent graph 228 as illustrated in step 610. The impact parameter 234 is representative of degree of complexity of changes in the system due to the component. An initial value of impact parameter 234 is determined based on the sum of weights associated with the subset of links identified in step 608. Then, a final value of impact parameter 234 is computed by accounting complexity of implementing the change request. In one embodiment, the final value of the impact parameter 234 is computed based on the number of function codes corresponding to the traversed path. Specifically, the initial value of the impact parameter 234 is modified using a power law. A number of input-output ports associated with number of function codes the traversed path is used as a parameter for the power law. The number of input-output ports is determined from the number of function codes.

The method 600 includes computing a plurality of change parameter 236 values based on the traversed path at step 612. The plurality of change parameter values 236 are representative of degree of complexity of changes in the system due to the plurality of categories of components. The plurality of change parameter values 236 for the plurality of categories of components is computed based on the number of affected nodes corresponding to each of the plurality of category of components. In one embodiment, the plurality of change parameter value values 236 may also be modified using the power law used to modify the impact parameter 234.

At step 614, the method 600 further includes determining an effort estimate based on the impact parameter 234 value and the plurality of change parameter values 236 using a machine learning technique. The effort estimate includes a schedule for implementing the change request and a cost of implementing the change request. In one embodiment, the machine learning technique is determined based on a labeled dataset including a plurality of request changes and corresponding plurality of actual effort estimates. It may be noted that machine learning technique may include, but not limited to, a neural network based learning and a regression technique.

The method 600 also includes implementing the change request based on the effort estimate as illustrated in the step 616. In one embodiment, implementing the change request includes communicating the effort estimate to the customer, automatically configuring the one or more components of the process plant and updating configuration files required by the industrial plant and/or industrial automation system after implementing the change request.

The invention claimed is:

1. A method for configuring one or more components among a plurality of components of a process plant to optimize an industrial process deployed in the process plant, wherein the method is performed by a computing system, the method comprising:
receiving a change request by a data acquisition system via a client station, wherein the change request comprises a specification of modification required in a component among the plurality of components of the process plant;
receiving, from a database unit, a system dependency graph corresponding to the process plant, wherein the system dependency graph comprises a plurality of nodes representative of the plurality of components of the process plant coupled with one another via a plurality of links representative of dependency weights;
selecting a subset of components among the plurality of components related to the component specified by the change request based on configuration of the process plant;
identifying a subset of nodes among the plurality of nodes corresponding to the subset of components and the component specified by the change request by traversing the system dependent graph, wherein the subset of nodes corresponds to a plurality of categories of components;
computing an impact parameter value based on a traversed path in the system dependent graph, wherein the impact parameter is representative of degree of complexity of changes in the system due to the component;
computing a plurality of change parameter values based on the traversed path, wherein the plurality of change parameter values are representative of degree of complexity of changes in the system due to the plurality of categories of components;
determining an effort estimate based on the impact parameter value and the plurality of change parameter values using a machine learning technique, wherein the effort estimate comprises a schedule for implementing the change request and a cost of implementing the change request; and
implementing the change request based on the effort estimate, wherein the implementing the change request comprises configuring the one or more components of the process plant,
wherein the machine learning technique is determined based on a labelled dataset comprising a plurality of request changes and corresponding plurality of actual effort values.

2. The method of claim 1, wherein the components represented by nodes of the system dependency graph comprises at least one of a tag, a human machine interface component, a topology element, a control logic diagram, a function, a program organization unit, a controller, and an application.

3. The method of claim 1, wherein each of the nodes of the system dependency graph is represented by a triple comprising a unique identifier, a type of component and a display name.

4. The method of claim 1, wherein each of the plurality of links is represented by a quintuple comprising an unique identifier, a source node, a destination node, a relation between the system components with reference to a link under consideration and a weight value between the source node and the destination node.

5. The method of claim 1, wherein the plurality of change parameter values for the plurality of categories of components is computed based on the number of affected nodes corresponding to each of the plurality of category of components.

6. The method of claim 1, wherein the impact parameter value for the component is computed based on a number of function codes in the traversed path using a power law.

7. The method of claim 1, wherein the system dependency graph is constructed based on dependency data collected using a plurality of application program interfaces (APIs).

8. The method of claim 1, wherein determining the effort estimate comprises:
modifying an impact metric using a power law model based on change data corresponding to function codes in the system dependency graph; and providing an input vector to be processed by the machine learning technique to determine the effort estimate.

9. A system for configuring one or more components among a plurality of components of a process plant to optimize an industrial process deployed in the process plant, the system comprising:
 a data acquisition unit communicatively coupled to a client station and configured to receive a change request, wherein the change request comprises a specification of modification required in a component among the plurality of components of the process plant;
 a database unit communicatively coupled to the data acquisition unit and configured to store historical data generated by the process plant and a plurality of configuration files corresponding to the plurality of components;
 a graph builder unit communicatively coupled to the database unit and configured to build a system dependency graph corresponding to the process plant based on a plurality of configuration files corresponding to the plurality of components, wherein the system dependency graph comprises a plurality of nodes representative of the plurality of components of the process plant coupled with one another via a plurality of links representative of dependency weights; and
 a machine learning unit communicatively coupled to the graph builder and configured to:
  select a subset of components among the plurality of components related to the component specified by the change request based on configuration of the process plant;
  identify a subset of nodes among the plurality of nodes corresponding to the subset of components and the component specified by the change request by traversing the system dependent graph, wherein the subset of nodes corresponds to a plurality of categories of components;
  compute an impact parameter value based on a traversed path in the system dependent graph, wherein the impact parameter is representative of degree of complexity of changes in the system due to the component;
  compute a plurality of change parameter values based on the traversed path, wherein the plurality of change parameter values are representative of degree of complexity of changes in the system due to the plurality of categories of components;
  determine a machine learning technique based on a plurality of labelled change requests with corresponding actual effort values:
  determine an effort estimate based on the impact parameter value and the plurality of change parameter values using a using the machine learning technique, wherein the effort estimate comprises a schedule for implementing the change request and a cost of implementing the change request; and
  implementing the change request based on the effort estimate, wherein the implementing the change request comprises configuring the one or more components of the process plant.

10. The system of claim 9, wherein the components represented by nodes of the system dependency graph comprises at least one of a tag, a human machine interface component, a topology element, a control logic diagram, a function, a program organization unit, a controller, and an application.

11. The system of claim 9, wherein the machine learning unit is further configured to modify the impact parameter value using a power law model based on a change parameter value corresponding-to the to function codes in the system dependency graph.

12. A method for configuring one or more components among a plurality of components of a process plant to optimize an industrial process deployed in the process plant, wherein the method is performed by a computing system, the method comprising:
 receiving a change request by a data acquisition system via a client station, wherein the change request comprises a specification of modification required in a component among the plurality of components of the process plant;
 receiving, from a database unit , a system dependency graph corresponding to the process plant, wherein the system dependency graph comprises a plurality of nodes representative of the plurality of components of the process plant coupled with one another via a plurality of links representative of dependency weights;
 selecting a subset of components among the plurality of components related to the component specified by the change request based on configuration of the process plant;
 identifying a subset of nodes among the plurality of nodes corresponding to the subset of components and the component specified by the change request by traversing the system dependent graph, wherein the subset of nodes corresponds to a plurality of categories of components;
 computing an impact parameter value based on a traversed path in the system dependent graph, wherein the impact parameter is representative of degree of complexity of changes in the system due to the component;
 computing a plurality of change parameter values based on the traversed path, wherein the plurality of change parameter values are representative of degree of complexity of changes in the system due to the plurality of categories of components;
 determining an effort estimate based on the impact parameter value and the plurality of change parameter values using a machine learning technique, wherein the effort estimate comprises a schedule for implementing the change request and a cost of implementing the change request, and wherein determining the effort estimate comprises:
  modifying an impact metric using a power law model based on change data corresponding to function codes in the system dependency graph; and
  providing an input vector to be processed by the machine learning technique to determine the effort estimate; and
  implementing the change request based on the effort estimate, wherein the implementing the change request comprises configuring the one or more components of the process plant.

* * * * *